Figures 1, 2:
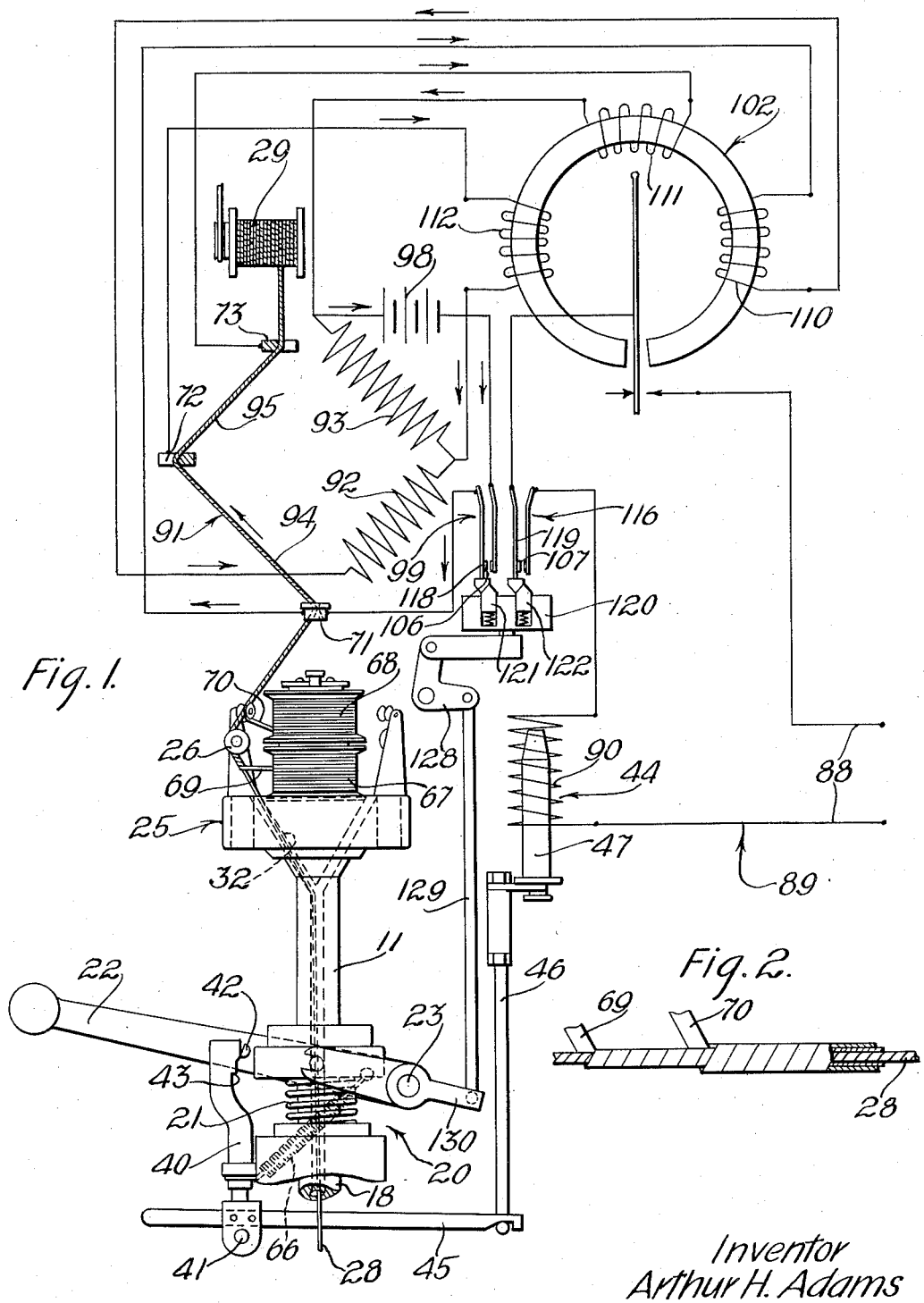

Nov. 25, 1930.  A. H. ADAMS  1,782,397
APPARATUS FOR TESTING ELECTRICAL CONDUCTORS
Filed Nov. 21, 1925

Inventor
Arthur H. Adams
by /s/ Atty.

Patented Nov. 25, 1930

1,782,397

UNITED STATES PATENT OFFICE

ARTHUR HERMAN ADAMS, OF LA GRANGE, ILLINOIS, ASSIGNOR TO WESTERN ELECTRIC COMPANY, INCORPORATED, OF NEW YORK, N. Y., A CORPORATION OF NEW YORK

APPARATUS FOR TESTING ELECTRICAL CONDUCTORS

Application filed November 21, 1925. Serial No. 70,456.

This invention relates to apparatus for testing electrical conductors, and more particularly to apparatus for testing a traveling electrical conductor.

The principal object of the invention is to provide an electrically operated apparatus for accurately testing electrical conductors over a wide range of voltage in the operating current supply.

In order to attain this object there is provided in one embodiment of the invention, an apparatus for continuously defining adjacent sections of a traveling electrical conductor and associating them with a circuit including a Wheatstone bridge. An indicating or controlling relay with windings disposed in two arms of and across the bridge accurately responds to slight variations in an electrical characteristic of the conductor over a wide range of variations in the voltage of the operating current supply source.

The invention is herein disclosed in connection with mechanism for automatically controlling the operation of an apparatus for producing a composite conductor comprising a textile core having superimposed layers of tinsel. The conductor is drawn from a serving mechanism by means of a take-up spool which also draws the conductor through contacting members adapted to engage the conductor continuously and define adjacent predetermined lengths thereof. These adjacent lengths of the conductor form parts of an electrical operating circuit of the apparatus, which circuit embodies the principle of a Wheatstone bridge. Two adjacent arms on one side of the bridge are composed of fixed resistances, while the other two arms are composed of resistances including the adjacent lengths of the conductor. A relay having three windings is provided, one winding of which is connected in series with one of the fixed resistances, another winding being connected in series with one of the conductor resistances, while the third winding is connected across the bridge. Normally, a potential difference exists across the bridge resulting in a current flowing through the relay winding connected across the bridge, the magnetic action of which, combined with the magnetic action of the relay winding connected with the conductor resistance, predominates the magnetic action of the third relay winding to maintain the relay contacts open under normal operating conditions. The relay controls an electrical circuit which includes the winding of a solenoid designed to operate a clutch controlling the serving mechanism of the apparatus.

Other objects and advantages of the invention will become apparent in the following detailed description, reference being had to the accompanying drawings, wherein Fig. 1 illustrates schematically an apparatus embodying the invention, and Fig. 2 is an enlarged detailed view, partially in section, of a portion of a composite conductor which is particularly adapted to be tested by the improved apparatus.

Referring now to the drawing in detail, the numeral 11 indicates a vertically disposed hollow spindle, which may be rotatably mounted in a suitable supporting frame (not shown). The spindle 11 may be operatively connected to and disconnected from a main drive shaft 18 by means of a suitable clutch mechanism 20 actuated by a lever 22 secured to a rotatable shaft 23. The clutch mechanism 20 may be of any well known construction and therefore a detailed description thereof is believed to be unnecessary. Disposed between the driving and driven members of the clutch is a compression spring 21 which normally holds the clutch in its disengaged position.

Secured to the spindle 11 so as to be rotatable therewith is a serving head 25, which may be of the type disclosed and claimed in the copending application of G. A. Bouvier, Serial No. 699,441, filed March 15, 1924, and reference may be had to such application for a more detailed description thereof. Carried by the serving head 25 is a guide pulley 26 over which a cotton core 28 is drawn by a take-up spool 29 from any suitable source of supply (not shown), the take-up spool being driven in synchronism with the serving mechanism by any suitable means (not shown). The cotton core passes through the hollow spindle 11, through an aperture 32 in the serving head 25, and around the guide pulley 26.

When the serving mechanism is in operation the clutch 20 is held in its engaged position against the action of the spring 21 by a resiliently mounted latch 40 which is pivoted at 41 and provided with a notched portion 43 adapted to engage a pin 42 secured to the clutch lever 22. The latch 40 is actuated by a solenoid 44, a winding 90 of which is included in an electrical circuit 89 which may be connected to any suitable source of current (not shown) by conductors 88. A horizontally disposed bar 45 is secured, at one end, to the latch 40 and operatively connected, at its other end, to a vertically disposed rod 46 which is fastened to a plunger 47 of the solenoid 44. The arrangement is such that when the solenoid is energized and attracts its plunger 47, the rod 46 is disengaged from the pin 42 against the tension of a spring 66, thereby causing the clutch mechanism to be disengaged due to the action of the spring 21.

Rotatably mounted on the spindle 11 are spools 67 and 68 from which tinsel strands 69 and 70, respectively, are drawn and superimposed on the cotton core 28 in a manner fully described and claimed in the above mentioned copending application. The composite conductor travels from the serving head to the take-up spool through contacting members 71, 72 and 73 which are stationary with respect to the traveling conductor and are positioned to continuously define adjacent sections thereof.

The mechanism thus far described may be similar to that fully disclosed in the copending application of G. A. Bouvier, Serial No. 70,453, filed November 21, 1925, and since it forms no part of this invention, reference is directed to the above mentioned application for a more detailed description thereof.

The improved electrical testing mechanism comprises a detector circuit within which is included a Wheatstone bridge arrangement 91 and a relay 102. The detector circuit may be energized by current supplied by a battery 98, or other suitable source of electrical current, and may be controlled by a switch 99 actuated by the clutch lever 22 through suitable mechanical linkage hereinafter described. Two adjacent arms on one side of the Wheatstone bridge 91 include resistances 94 and 95, respectively, formed of the composite conductor, while the other two arms of the bridge include fixed resistances 92 and 93, respectively. The resistance 94 includes that section of the composite conductor which is disposed between the contacting members 71 and 72 and the resistance 95 includes that section of the composite conductor which is disposed between the contacting members 72 and 73.

A winding 110 of the relay 102 is electrically connected within the bridge 91 so that its resistance is included in the arm with the fixed resistance 92. A second winding 111 of the relay is electrically connected in the arm including the conductor resistance 95, while a third winding 112 of the relay is connected across the bridge. The relay 102 is provided with suitable armature contacts whereby it controls the electrical circuit 89, which latter circuit is also controlled by a switch 116 actuated simultaneously with the switch 99 by the clutch lever 22. Movable contacts 106 and 107 of the switches 99 and 116 are secured to leaf springs 118 and 119, respectively, and are actuated by a horizontal slide member 120 within which a pair of plungers 121 and 122 are resiliently mounted. The heads of the plungers are formed into suitable cams which cooperate with cams formed at the lower ends of the leaf springs 118 and 119 to open and close the switches 99 and 116 in response to horizontal movement of the slide member 120. The slide 120 is pivotally connected to one end of a bell crank lever 128, the other end of which is pivoted to one end of a link 129. The opposite end of the link 129 is pivoted to the free end of a lever 130 secured to the clutch lever shaft 23. When the lever 22 is moved downwardly to cause engagement of the clutch 20, the link 129 is moved upwardly, turning the bell crank lever 128 in a counter-clockwise direction. The slide 120 is thereby moved to the left, causing the plungers 121 and 122 to move downwardly and slip past to the opposite sides of the cams formed at the ends of the leaf springs 118 and 119, respectively. The plungers then move upwardly to their original positions, due to the action of compression springs individual thereto, causing the leaf springs 118 and 119 to move to the right thereby closing the switches 99 and 116.

In the operation of the above described apparatus, the clutch lever 22 is moved downwardly to cause engagement of the clutch 20, thereby starting the operation of the take-up spool 29 and the serving head 25. At the same time, the switches 99 and 116 are closed by the downward movement of the clutch lever 22 by means of the mechanical linkage above described. The switch 99 closes the detector circuit over which an electrical current may be traced as follows: from the positive terminal of the battery 98, through the switch 99 to the contacting member 71, where it is distributed through both sides of the bridge 91, a portion of the current passing through the conductor sections 94 and 95 and the relay winding 111 to the negative terminal of the battery, and a portion of the current passing through the relay winding 110 and the fixed resistances 92 and 93 to the negative terminal of the battery.

As indicated by the arrows (Fig. 1), the direction of flow of the current passing through the relay winding 110 is opposite to that of the current passing through the relay winding 111. This causes the magnetic action of the relay winding 110 to oppose the magnetic action of the relay winding 111. The magnetic action of the winding 110 tends to close the relay contacts and thereby stop the serving apparatus, while the magnetic action of the winding 111 tends to hold the relay contacts open to permit the continuous operation of the apparatus.

When the conductivity of the conductor included in the bridge circuit is within certain prescribed limits, the magnetic action of the relay winding 111 is greater than the magnetic action of the relay winding 110. The relay contacts are therefore held open permitting the continuous operation of the serving apparatus. Moreover, under normal operating conditions, that is, when the apparatus is producing a conductor of a predetermined conductivity, the circuit is so designed that a potential difference exists across the bridge resulting in a current of a predetermined amperage flowing through the relay winding 112 in a direction which is opposite to that of the current flowing through the relay winding 110 and similar to that of the current flowing through the relay winding 111, as shown by the arrows (Fig. 1). This produces a magnetic action in the relay winding 112 which aids the magnetic action of the relay winding 111 to hold the relay contacts open.

When an imperfect section of the conductor is advanced by the apparatus, (a section of the conductor being said to be imperfect when its conductivity is below a certain predetermined set standard), or if for any reason a defect occurs in a section of the conductor while it is disposed in the arm 94 or arm 95 of the bridge, it is obvious that the normal unbalanced condition of the bridge network is changed. For instance, assuming that a break of one of the tinsel ribbons (Fig. 2) occurs in a section of the conductor while it is disposed within the arm 94 of the bridge, it is obvious that the resistance of that arm is increased since only one tinsel ribbon remains to carry the current. Moreover, the arrangement of the bridge network is such that an increase in the resistance of the arm 94 decreases the potential difference existing across the bridge, thereby decreasing the amount of current flowing through the relay winding 112, which obviously weakens its magnetic action tending to hold the relay contacts open. Furthermore, when the resistance of the arm 94 is increased above a certain predetermined value the arrangement of the bridge net work is such that the direction of the current flowing through the relay winding 112 is reversed, whereupon its magnetic action combined with the magnetic action of the relay winding 110 predominates to close the relay contacts. The solenoid circuit 89 is thereby closed causing the solenoid 44 to become energized and attract its plunger 47, actuating the clutch to stop the serving apparatus, as hereinbefore described.

An electrical testing arrangement embodying the features of this invention is accurate, sensitive, and efficient over a wide range of voltage in the current supply source. This is an important feature of the invention and is the result of the novel arrangement of parts of the testing circuit whereby variations in the voltage of the current supply source cannot change the direction of the resultant magnetic force of the relay, but merely change the magnitude of that force. That is, assuming that the relay contacts are open, an increase or decrease in the voltage of the current supply increases or decreases the magnetic force which holds the contacts open. However, a decrease in the voltage can never change the value of the magnetic force so as to close the relay contacts. On the other hand, when the relay contacts are closed, an increase or decrease in the voltage increases or decreases the magnetic force holding the contacts closed, but a decrease in the voltage can never change the value of the magnetic force so as to open the relay contacts.

When the conductor being tested comprises a core 28 having superimposed layers of tinsel, it is apparent that, should either of the tinsel ribbons break during the operation of the serving head 25, the section of the conductor including the break will immediately appear in the arm 94 of the bridge 91, and it will be understood that the resistance of the arm 94 will be increased as the break travels to the end thereof. The electrical unbalance of the bridge network is thereby changed causing the clutch to be actuated to stop the serving apparatus in the manner hereinbefore described.

In addition to its function of detecting broken layers of tinsel, the improved testing apparatus is also applicable for use in detecting portions of conductor whose conductivity is below a certain predetermined value. This is possible due to the relay winding 111 being included in the arm 95 of the bridge circuit, which arm also includes a section of the conductor. By this arrangement it is apparent that a uniform change in the resistance of the conductor in the arms 94 and 95 of the bridge circuit does not change the total resistances of each of those arms in the same ratio since the resistance of the relay winding 111 remains constant. The normal unbalanced condition of the bridge is therefore changed resulting in a change in the potential difference existing across the bridge, thereby changing the amount of current flowing through the relay winding 112.

In the present embodiment of the invention, the arrangement is such that when the resistance of the conductor being produced increases above a certain predetermined value in both of the arms 94 and 95 of the bridge circuit, the change in the potential difference across the bridge is such that the direction of the current flowing through the relay winding 112 is reversed, whereupon its magnetic action aids the magnetic action of the relay winding 110 to close the relay contacts whereby the clutch is actuated to stop the serving apparatus as hereinbefore described.

Although the invention as herein illustrated and described is particularly well adapted for testing a composite electrical conductor comprising a textile core having superimposed layers of tinsel, it should be understood that the invention is capable of other applications and should be limited only by the scope of the appended claims.

What is claimed is:

1. In an apparatus for testing an electrical conductor, an electrical circuit including a Wheatstone bridge, said bridge having an arm including a section of the conductor, and a relay associated with the bridge having a winding included in said arm and another winding connected across the bridge.

2. In an apparatus for testing an electrical conductor, an electrical circuit including a Wheatstone bridge, said bridge having an arm composed of a fixed resistance and an arm including a section of the conductor, and a relay associated with the bridge having a winding included in each of said arms.

3. In an apparatus for testing an electrical conductor, an electrical circuit including a Wheatstone bridge, said bridge having an arm composed of a fixed resistance and an arm including a section of the conductor, and a relay associated with the bridge having a winding included in each of said arms and a winding connected across the bridge.

4. In an apparatus for testing an electrical conductor, means for defining predetermined adjacent sections of the conductor, an electrical circuit including a Wheatstone bridge, said bridge having fixed resistances in two of its arms and resistances including the adjacent sections of the conductor in its other two arms, and a relay controlled by said bridge for indicating changes in conductivity between said adjacent sections of the conductor, said relay having a winding included with one of the fixed resistances, a second winding included with one of the resistances composed of the conductor, and a third winding connected across the bridge.

5. In an apparatus for testing an electrical conductor, a plurality of contacting members for defining predetermined adjacent sections of the conductor, means for causing a relative movement between the conductor and said contacting members, and an electrical circuit including a Wheatstone bridge for indicating changes in conductivity between said adjacent sections of the conductor, said bridge having fixed resistances in two of its arms and resistances including said adjacent sections of the conductor in its other two arms, and a relay having a winding connected in one of the arms in series with a section of the conductor and a winding connected across the bridge.

6. In an apparatus for testing an electrical conductor, a plurality of contacting members for defining predetermined adjacent sections of a conductor, an electrical circuit including a Wheatstone bridge for indicating variations in the conductivity in said sections of the conductor, said bridge comprising fixed resistances in two of its arms and resistances including said adjacent sections of the conductor in its other two arms, a relay having a winding included in one of the arms composed of a fixed resistance, a second winding included in one of the arms composed of a section of the conductor and a third winding being connected across the bridge, and means responsive to variations in the conductivity of said sections of the conductor for controlling the operation of the relay.

7. In an electrical control system, an electrically operated means, an electrical circuit for testing a conductor for changes in conductivity and defects, and for controlling said means including a Wheatstone bridge, said bridge comprising two fixed resistances and two resistances including the conductor, a relay having three windings, one of said windings being connected with one of the fixed resistances, a second winding being connected with one of the conductor resistances, a third winding being connected across the bridge, means for connecting an electrical current to the bridge, a portion of said current normally passing through the relay winding connected across the bridge in a direction such that its magnetic action tends to hold the relay contacts open.

8. In an electrical control system, an electrically operated means, an electrical circuit for testing a conductor for changes in conductivity and defects, and for controlling said means including a Wheatstone bridge, said bridge comprising two fixed resistances and two resistances including the conductor, a relay having three windings, one of said windings being connected with one of the fixed resistances, a second winding being connected with one of the conductor resistances, a third winding being connected across the bridge, means for connecting an electrical current to the bridge, a portion of said current normally passing through the relay winding connected across the bridge in a direction such that its magnetic action tends to hold the relay contacts open, and means responsive to a predetermined increase in the resistance of the conductor included in the bridge for changing the direction of the current passing through the relay winding connected across the bridge, whereby its magnetic action tends to close the relay contacts.

9. In an apparatus for testing an electrical conductor, an electrical circuit including a Wheatstone bridge designed to have a section of the conductor included in one arm thereof, a source of electrical current subject to variations in voltage, and an electrical indicating device responsive to variations in an electrical characteristic of the conductor, said device having windings included in a plurality of the arms of the Wheatstone bridge cooperating to render the indications independent of variations in voltage of the current supply.

10. In an apparatus for testing an electrical conductor, an electrical circuit including a source of electromotive force and a Wheatstone bridge having a section of the conductor included in one arm thereof, and an electrical indicating device responsive to variations in the conductivity of the conductor and having oppositely acting windings included in a plurality of the arms of the Wheatstone bridge and cooperating to render the indications independent of variations in the voltage of the source of electromotive force.

In witness whereof, I hereunto subscribe my name this 4th day of November, A. D. 1925.

ARTHUR HERMAN ADAMS.